United States Patent [19]
Embling et al.

[11] 3,866,220
[45] Feb. 11, 1975

[54] RADAR AND LIKE ECHO-DISPLAY APPARATUS

[75] Inventors: Clifford Arthur Embling, Buckhurst Hill; Alban Harrison, Woodford Green; Arthur Alfred Hawkes, Brentwood, all of England

[73] Assignee: Smith Industries Limited, London, England

[22] Filed: June 26, 1973

[21] Appl. No.: 373,701

[30] Foreign Application Priority Data
June 26, 1972   Great Britain ............... 29770/72

[52] U.S. Cl. .............. 343/5 ST, 343/5 PC, 343/17
[51] Int. Cl. ..................... G01s 7/04, G01s 7/26
[58] Field of Search ............ 343/5 ST, 17, 5 PC

[56] References Cited
UNITED STATES PATENTS

| | | | |
|---|---|---|---|
| 2,960,906 | 11/1960 | Fogel | 343/5 ST |
| 3,067,416 | 12/1962 | Möller et al. | 343/5 ST |
| 3,742,494 | 6/1973 | Embling et al. | 343/5 ST |

FOREIGN PATENTS OR APPLICATIONS

| | | | |
|---|---|---|---|
| 1,061,568 | 3/1967 | Great Britain | 343/5 ST |
| 1,182,855 | 12/1964 | Germany | 343/5 ST |

*Primary Examiner*—Richard A. Farley
*Assistant Examiner*—G. E. Montone
*Attorney, Agent, or Firm*—Elliott I. Pollock

[57] ABSTRACT

A ship's radar includes an electrically energized image-retaining panel that has a surface which is exposed continuously to a relative-motion plan-position echo-display on a cathode-ray-tube screen via a relay lens and a frequency-selective optical filter, so as to retain and display from the surface, time-varying images of the display, superimposed upon one another. The panel, which displays the cumulatively retained images in light of a different wavelength from that emitted by the cathode-ray-tube screen, is mounted on a table of a carriage mechanism to be moved relative to the cathode-ray tube in accordance with the ship's movement. The table is carried on a caged ring of balls that are sandwiched in the carriage mechanism between two independently-mounted friction plates that are urged together under spring pressure. One plate is driven along a straight line in accordance with speed measured by the ship's log and the other is driven from the ship's compass system to turn with change of direction of the ship, so that there is transmitted to the table via the ring of balls translation and turning directly analogous to that of the ship. The display from the panel is scanned by a stationary television camera using reflection from the filter, to derive a bright plan-position picture in which only moving-objects have rearwardly-extending true-track 'tails,' and the ship itself always appears at the center. The table carrying the panel is reset to a central position periodically, the spring pressure on the balls being relieved and electrical energization of the panel interrupted to erase the historical record, at this time.

12 Claims, 4 Drawing Figures

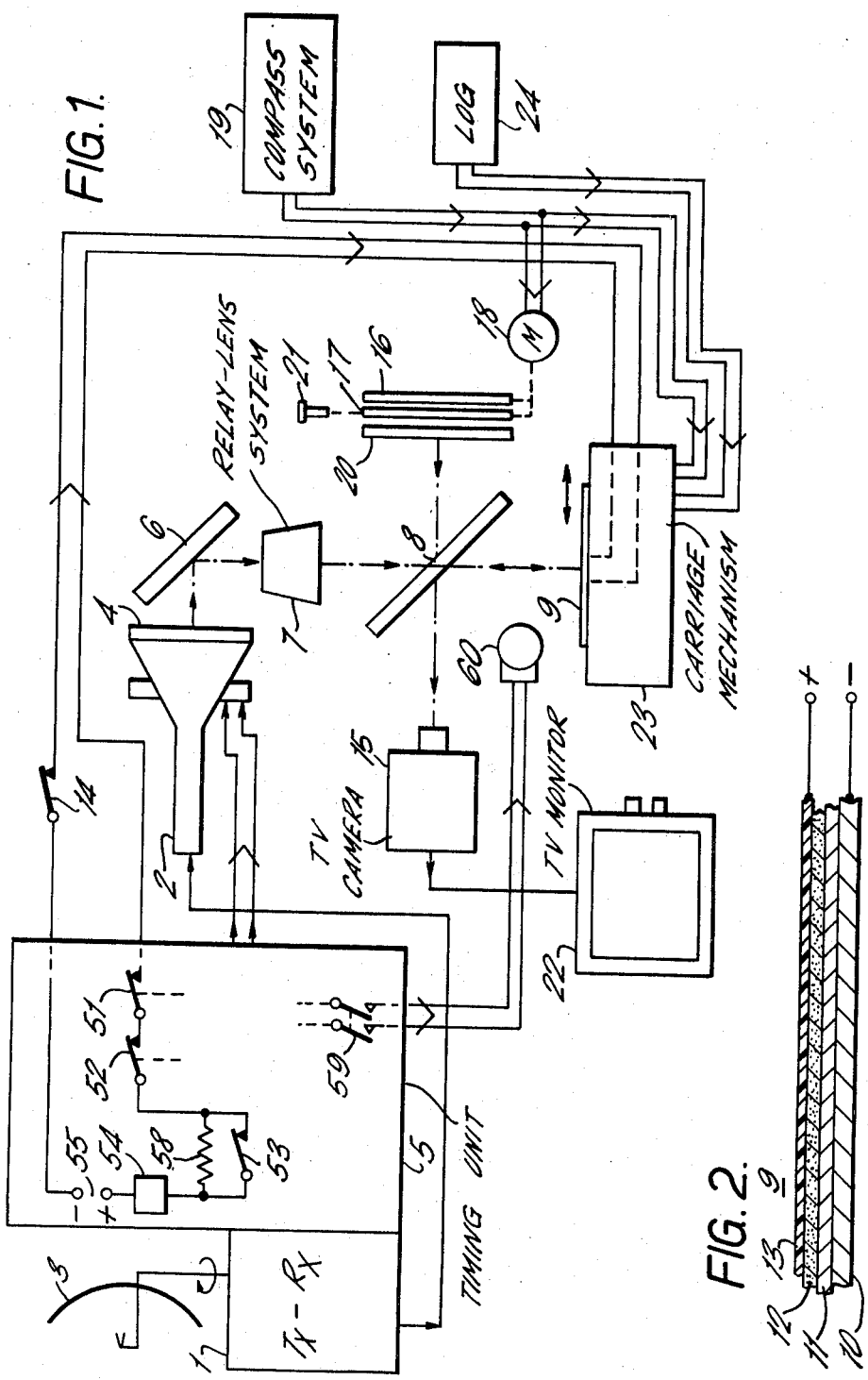

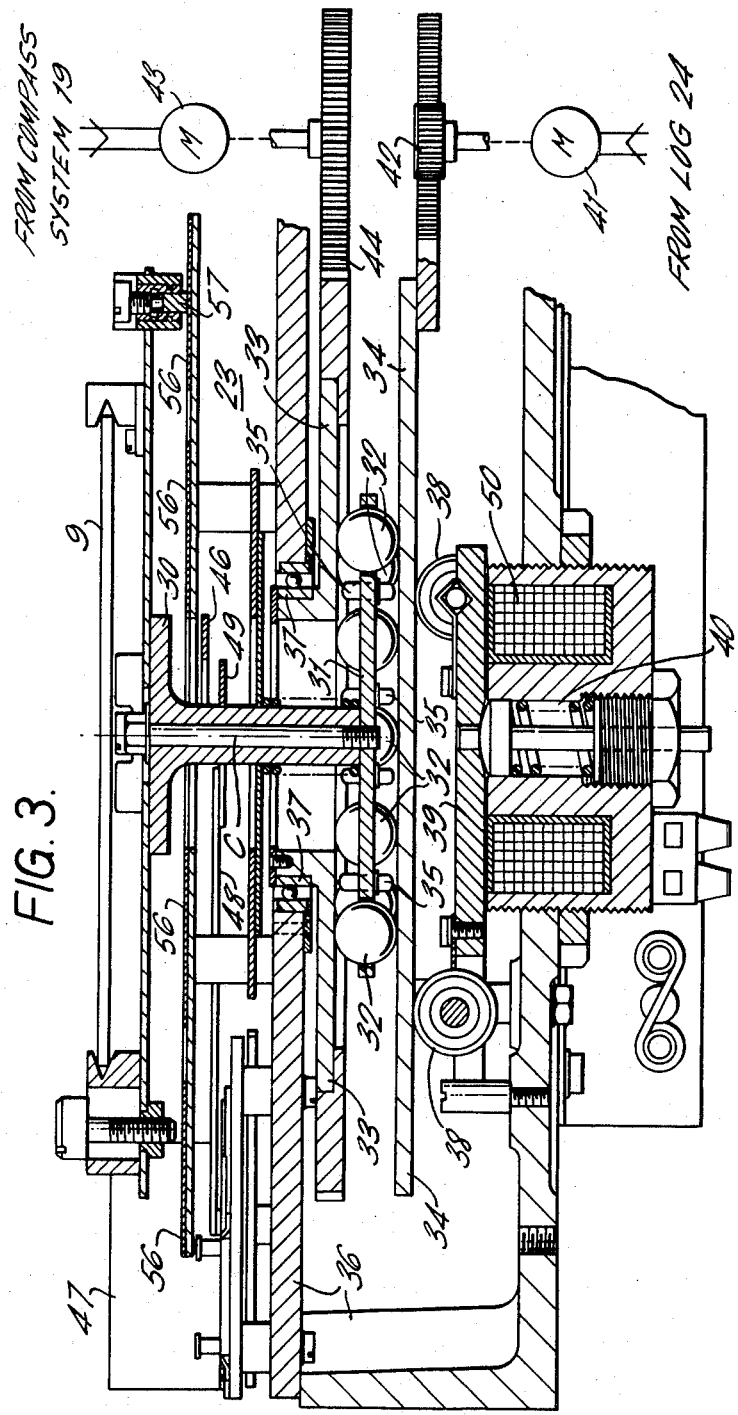

RADAR AND LIKE ECHO-DISPLAY APPARATUS

BACKGROUND OF THE INVENTION

This invention relates to echo-display apparatus as used, for example, in radar systems. The invention is especially, though not exclusively, applicable to the display of radar information in a ship.

Radar information is conventionally displayed in a ship as a plan-position display in which the objects or 'targets' from which the radar echoes are received, are represented on the screen of a cathode-ray tube with radial and angular displacements from a reference point, corresponding to their individual ranges and bearings from the radar-carrying ship. In the basic form of display the reference point, representing the radar-carrying ship, remains stationary on the cathode-ray-tube screen and the representations of targets, whether these targets are stationary or not, move across the screen. The movement in each case is in accordance with the movement of the target relative to the radar-carrying ship and represents the vector difference between the true movements of the ship and target. In the latter respect therefore, it is not readily possible to distinguish in the display between the targets that are actually moving and those, such as buoys and the coastline, that are stationary. This movement of the representations of stationary targets can give rise to smearing or blurring that reduces clarity of the display and may even obscure other target representations. Even apart from considerations of clarity and discrimination, the true direction and speed of any target can only be determined from the relative-motion display by plotting its position over a period of some minutes and then constructing an appropriate velocity-vector triangle based on the known speed and direction of the radar-carrying ship.

A true-motion display is often used instead of the basic, relative-motion form, and in this the representation of each moving object, including that of the radar-carrying ship, is caused to move across the cathode-ray-tube screen in true accord with its actual direction and speed of movement. The representations of all stationary objects remain stationary on the screen and are thereby readily distinguishable from moving targets without any smearing. There is however the disadvantage that it is not possible with this form of display to obtain an immediate appreciation of the rates of change of range and bearing of any target with respect to the radar-carrying ship. These rates are of importance in any assessment of the risk of collision and whereas they can be indicated using plotting and constructional techniques, the execution of such techniques, especially where a large number of targets is involved, is both tedious and time consuming.

Echo-display apparatus that may be used to overcome the disadvantages of both the relative- and true-motion displays is described in each of the earlier U.S. Patents of C. A. Embling, U.S. Pat. No. 3,803,596 issued Apr. 9, 1974, and of C. A. Embling and A. Harrison U.S. Pat. No. 3,742,494 issued June 26, 1973.

These earlier patents relate to two forms of echo-display apparatus for use with a moving craft, both of which include an image-retaining device that is operable to retain images of display representations to which it is exposed and to provide a display in accordance with the retained images. The image-retaining device is exposed to a display representation which is provided by a display means in accordance with echoes received by the craft from an area of surveillance, and which depicts the relative locations within the surveillance area of the objects from which the echoes are received. Relative displacement between the display means and the image-retaining device is effected in accordance with movement of the craft, so that this device retains cumulatively, and displays, superimposed, but relatively-displaced, images of the display representation provided from the received echoes.

The image-retaining device in this way can readily provide an advantageous historical record of the movements of the objects. In particular where the display means provides a relative-motion display, the display derived from the image-retaining device can be readily arranged to represent the objects in their true, current positional-relationship to the craft, with the representation of the craft maintained at a stationary (and, if desired, centrally located) point, and with lines or 'tails' extending rearwardly from the representations of the craft and the other moving objects to show their true tracks. Since the craft-representation is stationary an immediate appreciation of the rates of change of range and bearing to any other object can be obtained just in the same way as with a conventional relative-motion display. However, in this instance the added lines or 'tails,' indicating the true tracks of the moving objects and built up from the cumulative effect of superimposition of successive, earlier images on one another, enable the speeds and true directions of movement of all moving objects to be quickly and easily deduced. Stationary objects appear in the display without any rearwardly-extending 'tail' and can by this be readily distinguished from moving objects, so that in all these respects the display provided combines advantages individual to both the relative- and true-motion displays without the attendant disadvantages referred to above.

With the specific ship-borne radar systems described in the above-mentioned prior U.S. patents, the image-retaining device is moved in accordance with ship movement, relative to a cathode-ray tube that serves to provide a plan-position display of received radar echoes. The movement is in each case constrained to translations along each of two mutually perpendicular coordinate axes, and is effected in accordance with signals representing respectively the North-South and East-West components of movement of the radar-carrying ship. Since the components of movement are related to earth-defined axes it is however necessary with these earlier systems to provide for compass-stabilization of the display provided by the cathode-ray tube, and this together with the necessity to derive signals in accordance with the movement components is a practical disadvantage.

One of the objects of the present invention is to provide a form of echo-display apparatus, by which these latter disadvantages may be overcome.

SUMMARY OF THE INVENTION

According to the present invention there is provided echo-display apparatus wherein means for effecting relative displacement between a display means and an image-retaining device in accordance with movement of a craft, comprises a first member mounted for movement in a single straight line relative to said display means, means for driving the said first member along said straight line in accordance with movement of the craft, a second member for carrying the image-retaining device and mounted on said first member for angular displacement relative thereto about an axis defined with reference to said second member and such as to be translated parallel to said line in accordance with the movement of said first member, and means for displacing the said second member angularly about said axis relative to said first member in accordance with change in direction of the craft movement.

BRIEF DESCRIPTION OF THE DRAWINGS

A radar system that includes echo-display apparatus in accordance with the present invention, will now be described, by way of example, with reference to the accompanying drawings, in which:

FIG. 1 is a schematic representation of the radar system;

FIG. 2 is a sectional side elevation of an image-retaining panel used in the radar system of FIG. 1;

FIG. 3 is a sectional side elevation of part of a mechanism that is used for mounting the image-retaining panel in the radar system of FIG. 1.

DESCRIPTION OF THE PREFERRED EMBODIMENTS

Figure 4:
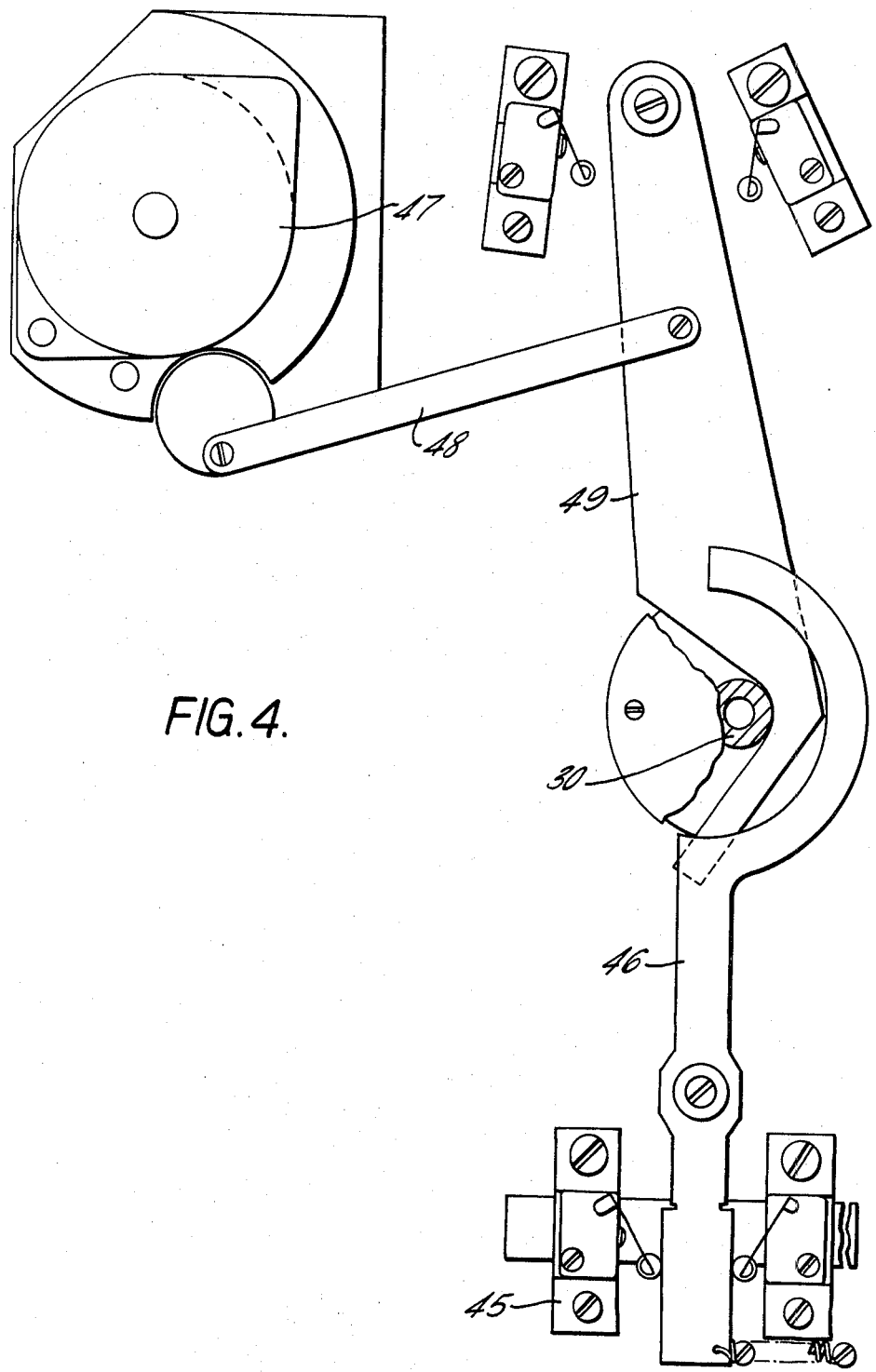
FIG. 4 is a plan view of parts of the mechanism of FIG. 3 that are concerned in a resetting operation which is performed periodically in the mechanism.

The radar system to be described is for use on a ship to provide a display that is of assistance in navigation.

Referring to FIG. 1, a radar transmitter-receiver 1 supplies to a cathode-ray display-tube 2 video signals corresponding to radio-frequency echo-signals that are received by an aerial 3 of the system. The aerial 3 rotates to receive echo-signals from all directions in azimuth, and the tube 2, in accordance with the video signals supplied to it sequentially by the transmitter-receiver 1, provides on its screen 4 an intensity-modulated plan-position display of the received echo-signals. A timing unit 5 associated with the transmitter-receiver 1 supplies to the tube 2 signals that produce at the screen 4 the rotating, and appropriately synchronized, radial time-base required to produce such display of the sequentially-applied video signals.

The display on the screen 4 after reflection by a mirror 6 is exposed through a relay lens-system 7 and a partially-transparent reflector 8 to an image-retaining panel 9 that is of a form sold by Thorn Electrical Industries Limited. This form of image-retaining panel is described in a paper entitled "The Image Retaining Panel," by A. S. Henderson, published in the journal "New Scientist," Volume 16, pages 686 to 688, and also in a paper entitled "Studies of the mechanism of the Thorn image-retaining panel" by G. F. J. Garlick, R. Harvey, P. J. Clewer and P. W. Ranby, published in the Bristish Journal of Applied Physics, 1969, Series 2, Volume 2, and, as shown in detail in FIG. 2 of the drawings accompanying the present specification, includes a metal substrate 10 that carries two superimposed vitreous-enamel layers 11 and 12. The uppermost layer 12 is embedded with an electroluminescent phosphor (basically zinc cadmium sulphide) and is coated with an electrically conductive transparent film 13. Unidirectional voltage derived within the timing unit 5 is applied between the substrate 10 and film 13 (film 13 being at a positive potential with respect to substrate 10) via a switch 14 (FIG. 1), and under these conditions irradiation of any area of the layer 12 with light, causes a yellowish glow to build up in that area in proportion to the intensity and duration of the irradiation. The emission of light is sustained after irradiation ceases, so the panel 9 has an effective memory by which it retains any image to which it is exposed. The image is retained in this way without any serious deterioration in sharpness and contrast, for a period of many minutes, provided the application of the unidirectional voltage is not interrupted. If there is interruption of the applied voltage for even a millisecond or so, the image is no longer retained. The switch 14 is normally maintained closed to apply unidirectional voltage to the panel 9 without interruption.

Referring more particularly to FIG. 1, exposure of the panel 9 to the screen 4 via the mirror 6, the lens system 7 and the reflector 8, causes the panel 9 to retain, and itself display, an image of the plan-position radar display provided by the cathode-ray tube 2. The retained display-image as reflected by the reflector 8 is scanned by a television camera 15. The camera 15 scans the reflected display-image superimposed on the images through the reflector 8 of a circumscribing bearing scale and a set of concentric calibration rings, that are projected from rear-illuminated photographic-transparency plates 16 and 17 respectively. The two plates 16 and 17 are rotated together by an electric motor 18 that is energized from the compass system 19 of the ship to maintain automatic compass-stabilized correlation of the bearing scale with the radar display. The ship's course-vector, which is stationary in the display, is indicated by superimposing on the images of the bearing scale and calibration rings the image of a radial line that is etched into an edge-illuminated transparent plate 20 fixed in front of the plates 16 and 17. A second radial-line image is provided by the plate 17 for use in the marking of any selected target or bearing in the radar display. In this respect the plate 17 (in addition to being rotated with the plate 16 by the motor 18 for compass stabilization) is arranged to be rotatable relative to the plate 16 by means of a manual control 21 so that the orientation of the marker line in the display can be changed when desired.

The video signals derived by the camera 15 from the superimposed display-images in the reflector 8 are supplied to a television monitor unit 22 (which may be one of a number of such units). The unit 22 has a large (for example, 23 inch) television screen and provides a bright, high-contrast picture of the superimposed display-images that is clearly visible to the navigation officer of the ship even under normal daylight conditions. This picture, which may provide the radar information in black on a green background or vice versa, is a composite plan-position display of the radar-information retained by the panel 9. The panel 9 by virtue of its retention cumulatively of the currently-applicable information as this is displayed on the screen 4, builds up an historical record of target movements within the area of radar surveillance.

The display provided on the screen 4 of the cathode-ray tube 2 is a relative-motion display, but the display provided by the panel 9 shows the targets and the radar-carrying ship with superimposed 'tails' represeenting their true tracks. To this end, the panel 9 is moved in a plane normal to the light path from the screen 4, in accordance with movements of the radar-carrying ship. More specifically, the panel 9 is carried by a carriage mechanism 23 that drives it sideways in accordance with the speed of the ship as signalled from the ship's log 24, and turns it about its own center in accordance with the changes in the ship's heading as signalled from the compass system 19. The sideways translation of the panel 9 is made in the fixed direction along the reciprocal to the 'ship's-head' vector of the display projected from the screen 4, and the correct orientation of the historical record relative to this vector is maintained by turning the panel 9 in the sense which in the projected display is counter to the heading change. In this way the composite display on the panel 9 is presented to the camera 15 with the radar-carrying ship always central and 'head up,' so that the resultant picture on the screen of the monitor 22 is the more easily related to the progress and aspect of any target as it would appear from the bridge of the ship itself.

Referring more especially to FIG. 3, the panel 9 is mounted in the mechanism 23 on a pedestal table 30 that is carried by a disc 31. The disc 31 cages a ring of symmetrically-spaced ball bearings 32 that are sandwiched between two friction plates 33 and 34, and carries projecting nylon-pins 35 that serve to hold the disc 31 in the common diametral plane of the bearings 32. The plate 33 is rotatably mounted on the fixed framework 36 of the mechanism by means of a ball-bearing race 37, whereas the plate 34 is constrained to lateral movement in a single straight line by means of rollers 38. The rollers 38 support the plate 34 and it is through these that pressure exerted on a carrier 39 by a spring 40 is applied to the plate 34 to urge and maintain contact of the bearings 32 with both plates 33 and 34.

An electric motor 41 mounted on the framework 36 is coupled through rack-and-pinion gearing 42 to drive the plate 34 along the rollers 38 in accordance with an electric pulse-signal representative of the speed of the ship, supplied from the ship's log 24. The linear movement applied in this way to the plate 34 is transferred (at half the speed) through the ball bearings 32 to the disc 31, and is effective to translate the table 30, and with it the panel 9, at an appropriate analogue of the ship's speed. This translation, which takes place parallel to the linear movement of the plate 34, is along the reciprocal of the ship's heading in the radar situation displayed by the panel 9.

The turning of the panel 9 that is required to maintain the panel-display with the ship's heading always in one direction parallel to the linear movement of the plate 34, is achieved by an electric motor 43. The motor 43, which is mounted on the framework 36 and is coupled to the plate 33 through gearing 44, is energized in accordance with a signal supplied by the ship's compass system 19. The plate 33 is rotated by the gearing 44, and this rotation is transferred (at half the speed and angle) through the ball bearings 32 to the disc 31. The consequent rotation of the table 30, and with it the panel 9, is always about the center of the ring of ball bearings 32, and therefore about the central axis C of the table 30. The angle of rotation applied to the panel 9 about the axis C is equal in magnitude to the compass heading-change of the ship, but is made in the counter sense such that together with the 'reciprocal' translation achieved through the drive applied to the plate 34, the panel 9 is maintained in an appropriate, true-motion registration with the current target-information as projected onto it from the screen 4. The display provided by the panel 9 and pictured by the monitor unit 22, accordingly shows the radar-carrying ship as a dot that remains always at the center of the picture. As time passes, a 'tail' grows rearwardly from this dot at a rate dependent on the true speed of the ship and showing its true track.

All targets are shown in the display-picture as dots with radial and angular displacements from the center in accordance with their current positional relationships to the radar-carrying ship. The range and bearing of any one of these targets from the ship is therefore obtainable directly from reference to the calibration and bearing rings appearing in the picture, and this also enables the rates of change of both range and bearing to be quickly appreciated. Furthermore, 'tails' grow rearwardly from all moving targets at rates appropriate to the true speeds of those targets and showing their true tracks. These true-track 'tails' enable the true speed and aspect (that is to say, the orientation with respect to the radar-carrying ship) of each moving target to be determined, and allow any changes in speed or course to be quickly detected.

The points in the picture that represent stationary targets, such as buoys and the coast-line, do not have true-track 'tails' and are therefore easily distinguishable from the representations of moving targets. The movements of the panel 9 in accordance with the movements of the radar-carrying ship, serve always to realign the retained representations of stationary targets with their current representations on the screen 4, and so there is no smearing or blurring of these representations in the televised picture.

The extent of translation of the panel 9 that can take place is limited and it is necessary to reset the table 30 whenever the panel 9 nears the end of the available travel. The resetting operation is carried out automatically through that part of the mechanism 23 shown more clearly in FIG. 4, being initiated from a switch 45 that responds to displacement of a hook-shaped lever 46 by the moving table 30. Operation of the switch 45 energizes an electrical stepping motor 47 to act through a link 48 on a lever 49 which bears on the table 30 and which under the drive applied from the motor 47 urges the table 30 back to the start of its travel. The return of the table 30 in this way is facilitated by relief of the pressure exerted on the carrier 39, and thence on the plate 34, by the spring 40. The relief is achieved by temporary energization of a solenoid 50 (FIG. 3) so as to attract the carrier 39 back against the spring-force at this time.

The display on the screen 4 of the cathode-ray tube 2 is blanked out during the resetting operation of the panel 9, and a shutter (not shown) is brought across the front of the camera 15 so that no new radar picture is provided by the monitor unit 22 while the resetting is carried out (a video-tape recording of the picture applicable immediately prior to the resetting operation may be displayed to preserve continuity during this operation). Application of unidirectional voltage to the panel 9 is also interrupted to erase the retained radar information, and is accompanied when restored, by the execution of a priming operation that serves to prepare the panel 9 to respond quickly to the subsequent display on the screen 4.

The process of erasure and priming of the panel 9 effected automatically during resetting, is also effected repeatedly at any selected one of a number of frequencies, for example, every 3, 6 or 12 minutes, by automatically-controlled transitory opening of a set of normally closed contacts 51 in the unit 5 (FIG. 1). The contacts 51 and a corresponding set of normally closed contacts 52 that are opened transitorily automatically during the resetting operation of the panel 9, are connected in the unit 5 in series with a set of normally closed contacts 53 and a relay device 54, to the positive pole of a unidirectional voltage source 55. In this way the contacts 51 and 52 control the application of voltage to the panel 9 via the switch 14 connected to the negative pole of the source 55. Electrical connection to the panel 9 is made within the mechanism 23 via two printed-circuit slip rings 56 (FIG. 3) that are contacted by individual brushes 57 (only one shown).

The relay device 54 serves to control the priming operation that is performed whenever the application of unidirectional voltage from the source 55 is re-established to the panel 9, whether the interruption of this results from opening of the contacts 51 or 52, or of the switch 14, or from any other cause. In this respect the set of contacts 53 is shunted by a resistor 58, and the relay device 54, as well as controlling the set of contacts 53, controls a set of contacts 59 that in turn control energization of a lamp 60 positioned adjacent the panel 9. The relay device 54 holds both sets of contacts 53 and 59 closed, thereby shunting the resistor 58 and energizing the lamp 60, when current flow is first re-established in the circuit interconnecting the panel 9 with the source 55. The lamp 60 (which provides blue light substantially free from infra-red radiation) is energized to provide high-intensity light flooding the layer 12 (FIG. 2) of the panel 9, and this causes the panel 9 to draw maximum current (for example, 30 milliamps) producing a rapid build-up of energy and causing the layer 12 to be brought into light-emission. The relay device 54 holds the contacts 59 closed to energize the lamp 60 in this way for a short period only (for example, for 1 second), and following the opening of the contact 59 opens the contacts 53 momentarily (for example, for 10 milliseconds) so as to introduce the resistor 58 and thereby reduce, but not interrupt, the voltage applied to the panel 9. Light emission from the panel 9 ceases once the light-stimulus provided by the lamp 60 ceases and the applied voltage has been reduced. But as soon as the contacts 53 close again to restore the full voltage, the panel 9 is then in a condition to retain and provide a bright display of the image from the screen 4 without any long period of build-up that otherwise would be necessary.

The image-retaining panel 9, although itself emitting yellowish light (wavelength 6,000 Angstrom units), has maximum sensitivity to blue light (wavelength 4,500 Angstrom units), and this fact accordingly leads to the choice of a blue-phosphor tube (of short persistence) for the cathode-ray tube 2. The fact that there is difference in wavelength between irradiation and emission of the panel 9, is however used to improve the efficiency of the optical arrangement. In this latter respect the reflector 8 is provided by a wideband optical-interference filter (such as sold by Barr and Stroud Limited) that transmits the blue light emitted by the tube 2, but reflects the yellowish light emitted by the panel 9.

Although in the system described above with reference to FIG. 1, target-information is written on the panel 9 during each complete sweep of the rotating time-base, this is not necessarily so, and it may be found advantageous, for example in reducing clutter in the resultant display, to suppress from the screen 4 target-information occurring in, say alternate sweeps.

The present invention has been described above in relation to a radar system, and although it is of particular merit in this context, it is to be understood as being of wider application than this. For example it may be applied to display arrangements of sonar systems, where display information concerning slow-moving targets can be made by virtue of the integrating action of the image-retaining panel, to stand out clearly from reverberations, and faster-moving targets can build up tracks that can be correlated and picked out by the eye against heavy background noise or interference.

We claim:

1. In apparatus which is for displaying echoes received by a moving craft from objects within an area of surveillance, and which includes an image-retaining device for exposure to a display representation provided in accordance with the received echoes and depicting the relative locations of said objects within said surveillance area, and means for effecting relative displacement between the said display representation and the image-retaining device in accordance with movement of the craft so as to produce corresponding displacement between successive, superimposed images of the display representation retained cumulatively in display by the image-retaining device: the improvement wherein said means for effecting relative displacement comprises a base structure, a first member mounted on said base structure for movement in a straight line defined in said base structure, means for driving the said first member along said straight line relative to said base structure in accordance with movement of the craft, a second member for carrying the image-retaining device, a third member mounted on said base structure for angular displacement about an axis defined in said base structure, means for displacing the said third member angularly about said structure-defined axis relative to said base structure in accordance with change in direction of the craft movement, and ball means carrying said second member, said ball means engaging with both said first and third members to translate said second member relative to said third member in accordance with the movement of said first member relative to said base structure, said engagement of the ball means with said first and third members also being operative to displace said second member angularly about an axis defined in said ball means in accordance with the angular displacement of said third member relative to said base structure.

2. Apparatus according to claim 1 wherein said ball means comprises a plurality of balls each of which bears on both said first member and said third member.

3. Apparatus according to claim 1 wherein said ball means comprises a plurality of balls that are sandwiched between said first and third members.

4. Apparatus according to claim 2 including means caging said balls in a ring.

5. Apparatus according to claim 3 including spring means for urging said first member against said balls and thereby urging said balls against said third member.

6. Apparatus according to claim 5 including resetting means operable to reset said second member to a datum position, said resetting means including means to oppose the action of said spring means while said second member is reset to said datum position.

7. Apparatus according to claim 1 wherein said display representation is a relative-motion plan-position representation of said echoes.

8. Apparatus according to claim 1 wherein said means for driving said first member comprises means for driving said first member in accordance with speed of the craft.

9. Radar apparatus for use on a moving craft, comprising means for receiving echoes from objects within a region of radar surveillance, display means for providing a plan-position display of the received echoes, an image-retaining device having a light-emitting surface, said image-retaining device being operable electrically to retain images of light patterns to which it is exposed and to emit light from said surface with a distribution thereacross in accordance with the retained images, and further means mounting the image-retaining device for exposure to the display means to retain cumulatively and thereby display from said surface superimposed images of the plan-position display, said further means comprising a base structure, a pair of parallel plate members spaced from one another, a caged ring of balls sandwiched between said plate members, means mounting a first of said plate members for translation along a straight line relative to both the second plate member and said base structure, means mounting the second plate member for angular displacement relative to said base structure, a table mounted centrally with respect to said caged ring of balls for carrying said image-retaining device, first motor means for driving said first plate member along said straight line relative to said base structure in accordance with craft movement, and second motor means for displacing said second plate member angularly relative to said base structure in accordance with change in direction of the craft movement.

10. Radar apparatus according to claim 9 wherein said first motor means comprises means for providing drive in accordance with speed of the craft.

11. Radar apparatus according to claim 9 wherein said second motor means comprises means for providing drive in accordance with change in compass direction.

12. Radar apparatus according to claim 9 including television camera means for viewing the said surface of the image-retaining device to derive electric video signals in accordance with the light patterns emitted from said surface.

* * * * *